United States Patent
Töpfer

(10) Patent No.: US 6,846,235 B2
(45) Date of Patent: Jan. 25, 2005

(54) CLOSING DEVICE FOR FLEXIBLE TUBULAR PACKAGING

(75) Inventor: Klaus Töpfer, Büttelbirn (DE)

(73) Assignee: Poly-Clip System GmbH & Co. KG, Frankfurt am Main (DE)

( * ) Notice: Subject to any disclaimer, the term of this patent is extended or adjusted under 35 U.S.C. 154(b) by 0 days.

(21) Appl. No.: 10/257,551

(22) PCT Filed: Nov. 30, 2001

(86) PCT No.: PCT/EP01/14025
§ 371 (c)(1),
(2), (4) Date: Mar. 4, 2003

(87) PCT Pub. No.: WO02/45517
PCT Pub. Date: Jun. 13, 2002

(65) Prior Publication Data
US 2003/0157874 A1 Aug. 21, 2003

(30) Foreign Application Priority Data
Dec. 6, 2000 (DE) .......................... 100 60 497

(51) Int. Cl.⁷ .............................................. A22C 11/12
(52) U.S. Cl. .............................. 452/48; 452/32; 53/577
(58) Field of Search ............................ 452/30, 32, 46, 452/48; 53/577

(56) References Cited

U.S. PATENT DOCUMENTS

| 4,438,545 A | * | 3/1984 | Kupcikevicius et al. | ...... 452/32 |
| 4,796,332 A | * | 1/1989 | Stanley | ........................ 452/48 |
| 5,405,288 A | * | 4/1995 | Stanley | ........................ 452/48 |

FOREIGN PATENT DOCUMENTS

EP          0 296 300 A2 * 12/1988

* cited by examiner

Primary Examiner—Stephen M. Johnson
(74) Attorney, Agent, or Firm—Norris McLaughlin & Marcus PA

(57) ABSTRACT

A device for closing tubular containers of flexible material, such as sausage casings or the like, contains plate-shaped constricting components for the purpose of forming constrictions in the container and a power-driven device for fastening a closure clip around the constrictions. The closure clip is advanced and pressed against a closing matrix by a punch. The power source for driving the punch and closing the closure clip is fastened to one of the constricting components and can swivel with it, whereby the punch of the device is guided on this constricting component across its entire advance path.

11 Claims, 5 Drawing Sheets

CLOSING DEVICE FOR FLEXIBLE TUBULAR PACKAGING

FIELD OF THE INVENTION

The invention relates to a device for closing tubular packagings such as sausage casings or the like, with plate-shaped constricting components, which are coupled to a common carrier and can swivel against each other, for closing the packaging tube, and with a punch driven by a power source as well as with a matrix interacting with it for closing a closure clip around the braid formed by the constriction of the packaging tube, wherein in the constricting components both a guidance feature for the punch is provided, and a matrix is arranged.

BACKGROUND OF THE INVENTION

Such a closing apparatus is known from U.S. Pat. No. 3,717,972. Both the punch and a double-acting cam plate for swiveling the two constricting arms serving as constricting components are fastened on the piston of a pneumatic cylinder. When the pneumatic cylinder is actuated, the cam plate initially swivels the constricting arms, which form a braid of the packaging tube (which is initially elongated in its cross-section). At the same time, appropriately designed sections of the constricting arms extend the guidance provided in the carrier for the punch, so that in the closed state of the constricting arms, this guidance extends to the matrix that is arranged in one of the constricting arms and the punch can close the closure clip guided by it around the braid of the packaging tube with the help of the matrix during an additional operating stroke of the pneumatic cylinder.

Such closing apparatuses are employed in particular on machines for stuffing large-sized individual sausages. They are arranged in front of the end of the stuffing tube, wherein the respective stuffing tube can be part of a multiple stuffing head so that during the stuffing process of a sausage, the tubular casing for the next sausage that is to be stuffed can be pulled onto a different similar stuffing tube. Although the processing speed of such stuffing processes is not even close to that of modern stuffing, portioning and closing machines for the production of strings of subsequent sausages, the time factor and the mechanical load of the packaging tube play a considerable role. Additionally there is the desire to keep the apparatus-related and operational efforts, in particular also the wear of the closing apparatus, as low as possible.

SUMMARY OF THE INVENTION

Proceeding from the above-described known closing apparatus, it is therefore the object of the invention to make available a construction more favorable both with regard to the construction costs, but above all also with respect to the costs and reliability during operation.

According to the invention, this task is resolved in that the power source is fastened on one of the constricting components and can be swiveled with it, and in that the punch is guided in this constricting component across its entire advance path. The actual closure process is independent from the prior constriction of the packaging tube. The latter occurs preferably by an iris-shaped constricting device, such as the object of DE-PS 199 34 154.0. Due to the fastening of the power source for the closure punch to a constricting component, it is pulled along—the pneumatic cylinder is also suitable for this—during the swivel process of the constricting component, and thus simultaneously guided towards the braid and the matrix, which is swiveled there with a different constricting component, so that only a relatively short stroke of the pneumatic cylinder is required in order to guide the (generally U-shaped) closure clip around the braid and close it around it with the help of the matrix.

The short advance path means not only correspondingly little wear and tear, but above all also reduced consumption of the propellant agent for the punch closure motion. The advantage of a short-stroke closure cylinder in particular in connection with a stationary closure clip magazine, which does not swivel along with the punch and its guidance when the cylinder swivels, is known from the older patent application 199 53 694.5. But there the punch is not integrated in the constricting unit.

In a beneficial embodiment, the arrangement of a constricting unit consists of three constricting components, which in each case are seated on one end on a circle concentric to the axis of the packaging tube offset by 120°, in such a way that one of the constricting components consists of a plate and carries the matrix, one consists of two plane-parallel sheets of metal with a distance that exceeds the thickness of the plate slightly, and the third constricting component consists in part of a plate, in part of two plane-parallel sheets of metal of that design, wherein the partitioning runs in the middle between the two ends of this constricting component and radially to the bearing circle (in the opening state). In this way, both the matrix and the punch guidance have stable carriers available which, however, can slide between the metal sheets of the respectively other constricting components with their sections no longer exposed during constriction, and in this way obtain a small thickness of the overall unit.

BRIEF DESCRIPTION OF THE DRAWINGS

Further beneficial embodiments of the invention result from the following description of an example based on the drawings, wherein.

DETAILED DESCRIPTION OF THE INVENTION

Figure 4:
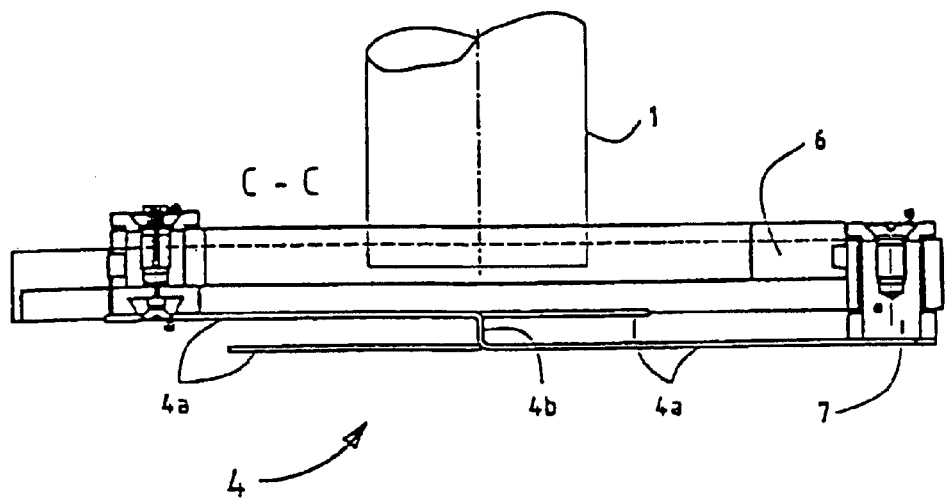
FIG. 4 Represents a view in the direction of line C—C in FIG. 1.
Figure 3:
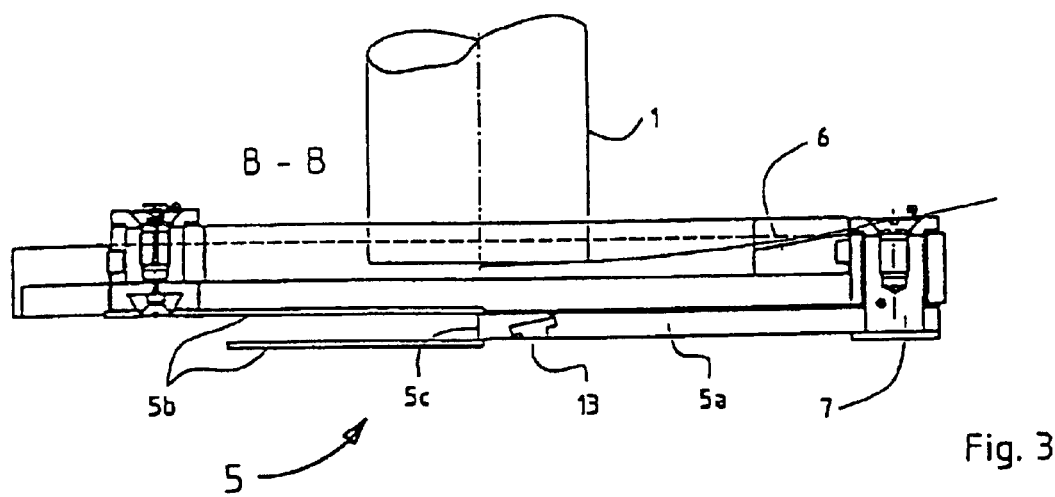
FIG. 3 Gives a view in the direction of line B—B in FIG. 1.
Figure 2:
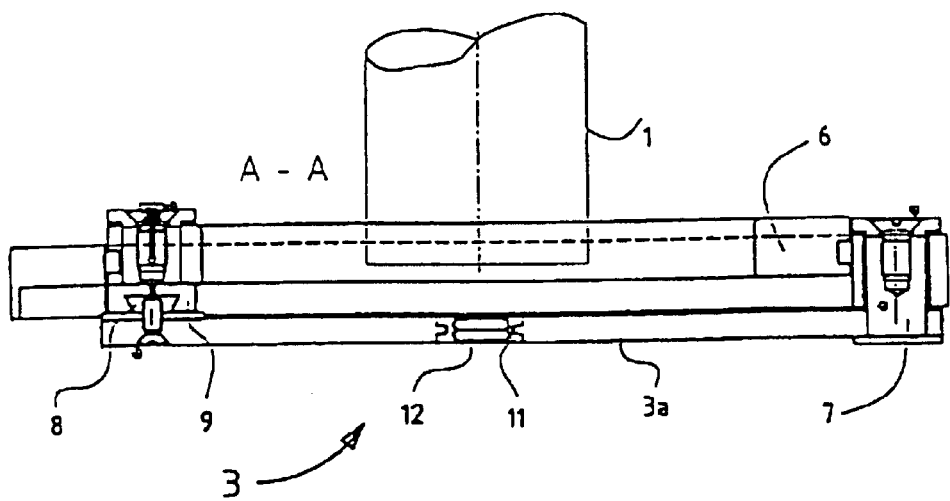
FIG. 2 Provides a view in the direction of line A—A in FIG. 1.
Figure 6:
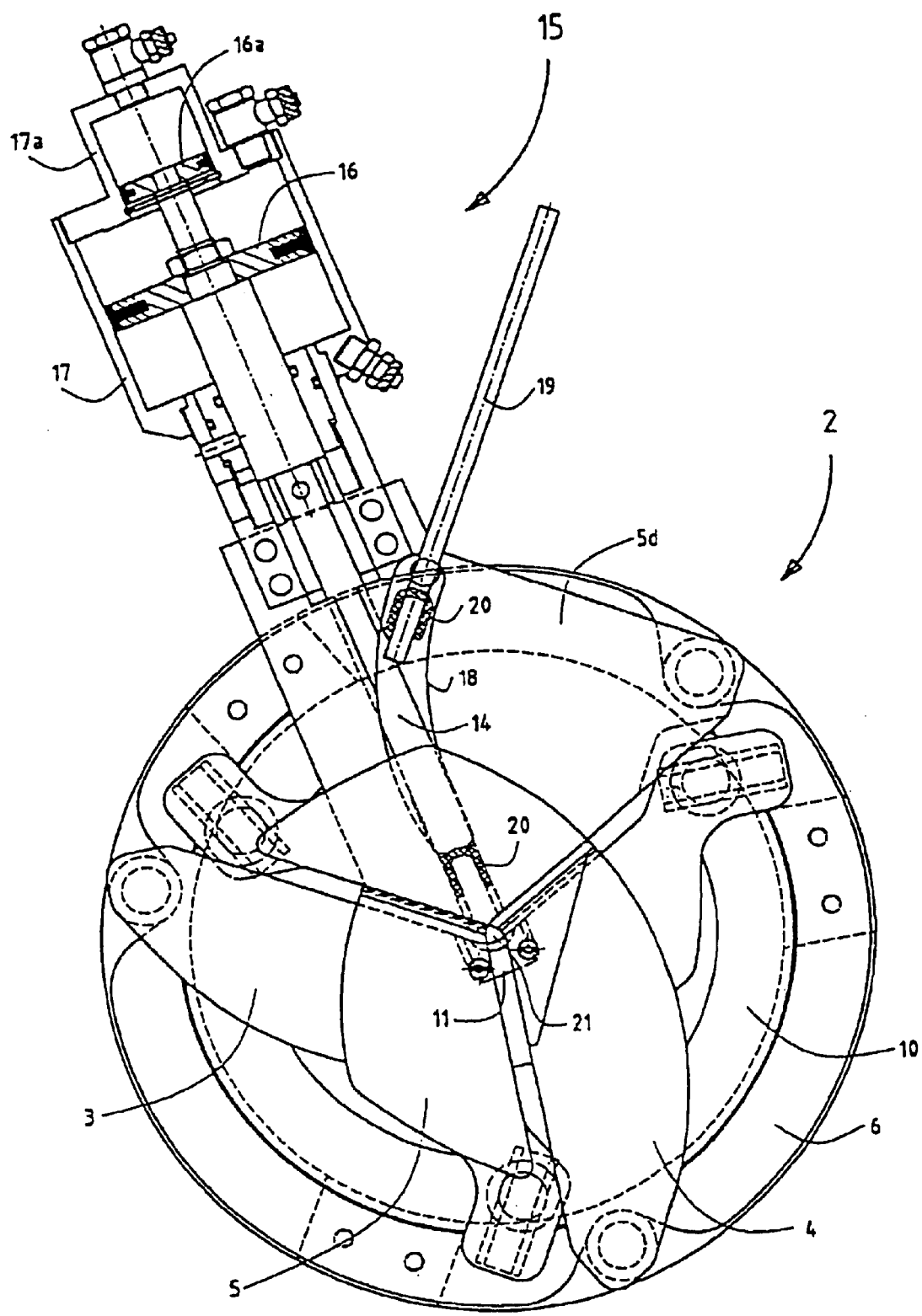
FIG. 6 Provides a similar front view upon closing the constricting components, and FIG. 7 Illustrates another similar view upon closing the ready closure clip.
Figure 7:
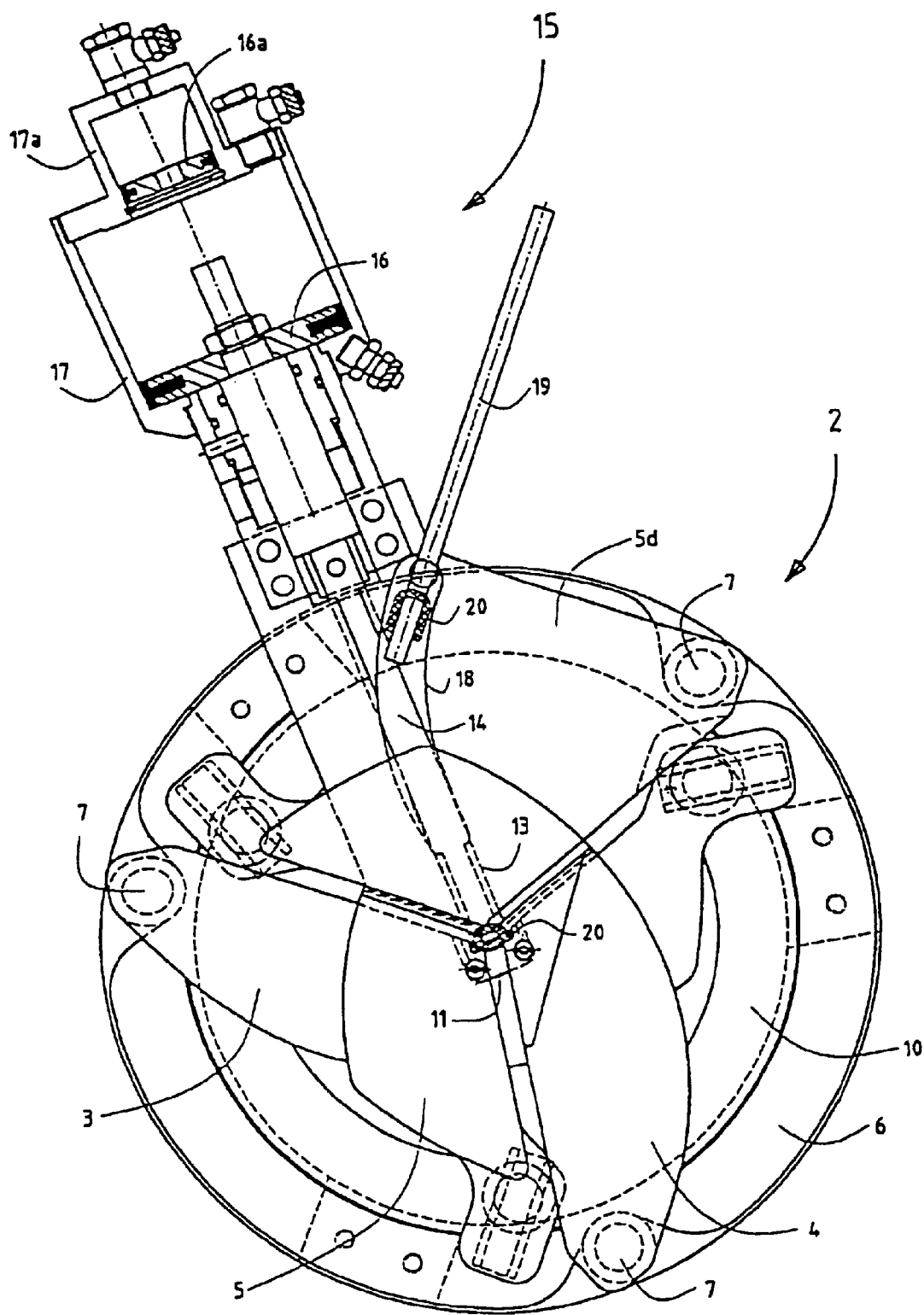

The constricting unit of the closing apparatus of the invention, designated as 2 in general, is arranged concentrically to the aperture of a stuffing tube 1, which is only indicated, (added in FIGS. 2–4). It basically consists of three plate-shaped constricting components 3, 4 and 5, which are seated with one of their ends in a swiveling manner on a stationary carrier ring 6 on pins 7—in each case mutually offset by 120°. The other ends of the constricting components 3, 4 and 5 each are seated with sliding blocks 8 in links 9 on a concentrically interior ring 10 in such a way that its rotation leads to a swiveling of the constricting arms and thus their closure, so that a packaging tube located in the opening is gathered into a braid (FIGS. 6 and 7). In addition, refer to DE-PS 199 34 154.

The operating areas of all constricting components 3, 4 and 5 therefore have a (rounded-off) bend of 120° in the center between their ends so that in the open state of the constricting unit the circumscribed opening takes on the shape of an equal-sided hexagon. The constricting component 3 consists of a continuous plate 3a, which in its bent area accommodates the matrix 11 with two parallel grooves 12 for the U-shaped closure clip 20 consisting of wire (FIG. 2). The constricting component 5 also half consists of a plate 5a corresponding to plate 3a and half of two plane-parallel metal sheets 5b, wherein the partitioning seam 5c runs radially in the open state shown in FIG. 1 (FIG. 3). The constricting component 4 consists overall of plane-parallel metal sheets 4a in the configuration which can be gathered from FIG. 4 with a cross wall 4b corresponding to the partitioning seam 5c. The distance between the metal sheets 4a and/or 5b exceeds the thickness of the plate sections 3a and/or 5a slightly so that upon swiveling the constricting components and closing the constricting unit, the latter find room between the first (FIGS. 6, 7).

Figure 1:
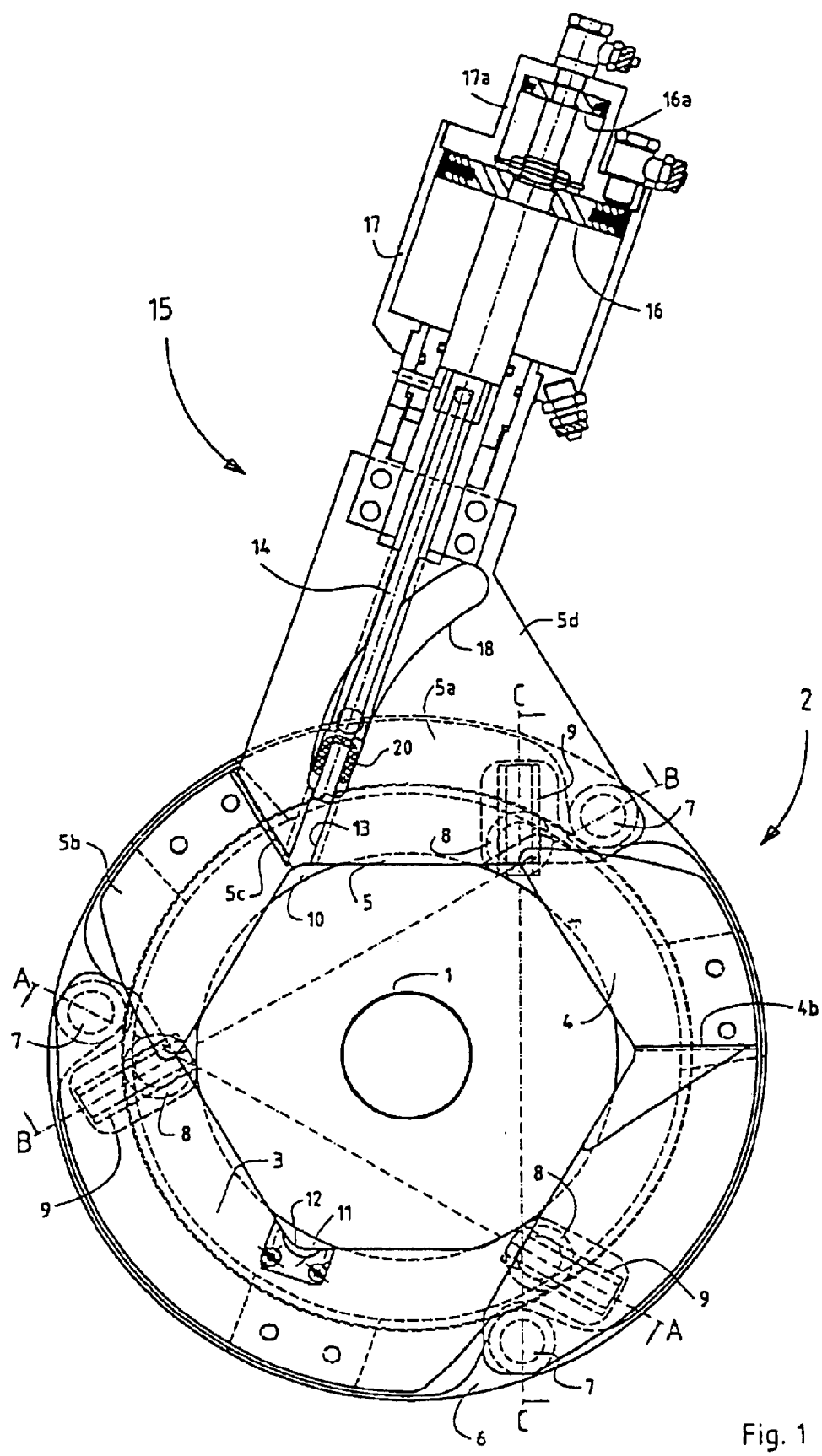
FIG. 1 Shows a front view of a constricting and closing apparatus in the (opened) resting state.

In the plate section 5a of the constricting component 5, the guidance 13 for the punch 14 of the closing apparatus, designated overall with 15, is provided (FIGS. 3, 1). The punch guidance 13 is, as clearly shown in FIG. 3, slightly swiveled so that during the closure process, the one leg of the U-shaped closure clip 20 reaches into the one groove 12 and the other leg in the other groove 12 of the matrix 11, resulting in a spiral-shaped closure state of the clip.

Figure 5:
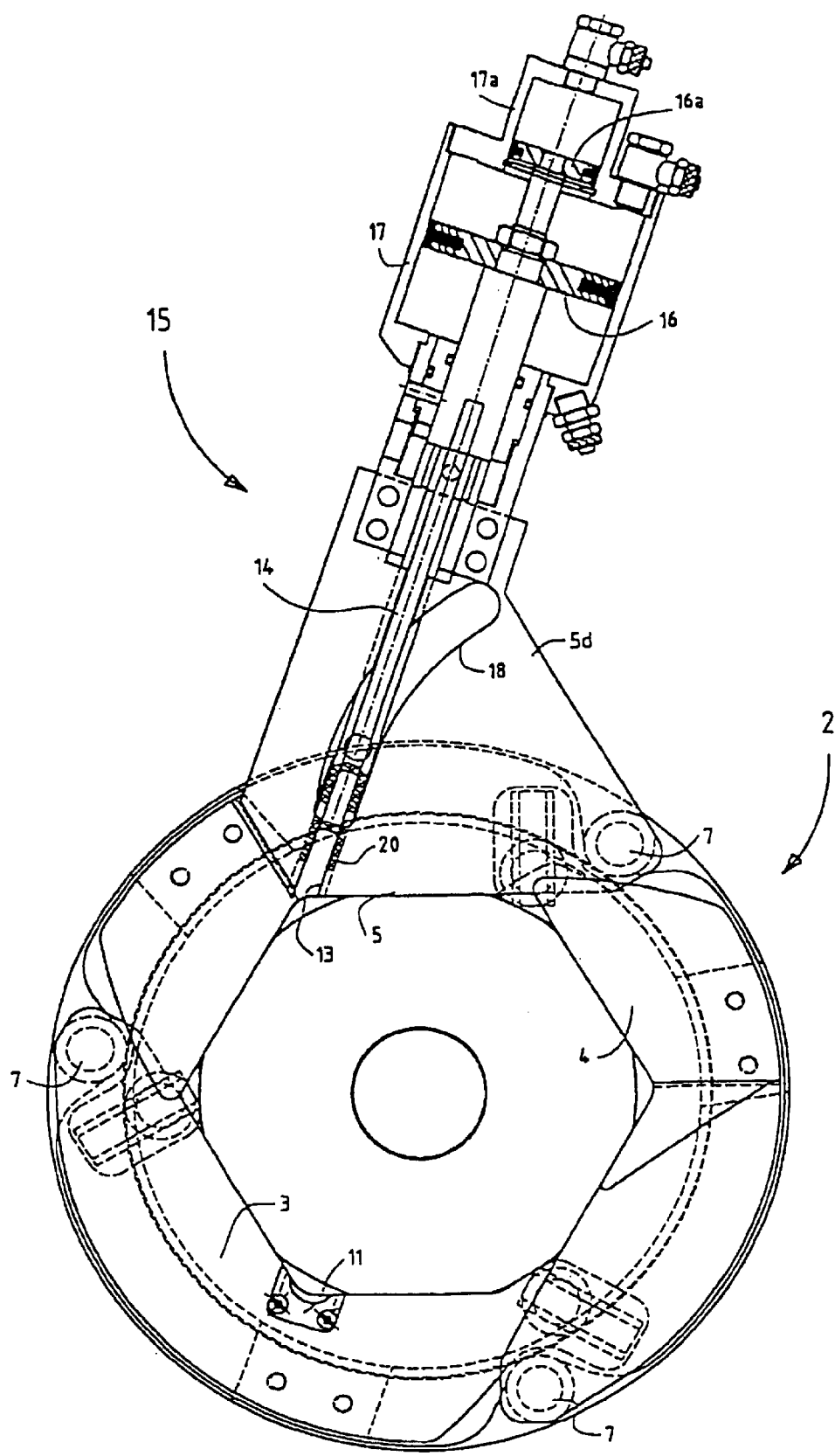
FIG. 5 Depicts a view in accordance with FIG. 1 after transferring a closure clip from the clip magazine into a state of readiness.

The punch 14 is fastened to the piston 16 of a pneumatic cylinder 17, which is fastened in turn on a flange 5d of the constricting component 5. The pneumatic cylinder 17 is constructed as a step cylinder with a cylinder section 17a of smaller diameter, whose piston 16a has a connecting action to the piston 16. Through a cut-out section 18 in the flange 5d, a stationary magazine 19—for example held on the support ring 6—extends for the supply of closure clips 20. This is not visible in FIGS. 1 and 5, but in FIGS. 6 and 7 because there the constricting component 5, which is swiveled with the pneumatic cylinder 7, exposes the view to that area.

In the starting position shown in FIG. 1, the magazine 19 is connected with the closure clips 20 located on it via an intake opening (not shown) of the punch guidance 13 so that a closure clip 20 can enter the clip advance channel formed by this guidance. By initially acting only on the piston 16a in the cylinder section 17a, the punch 14 is advanced and guides the clip 20 in its ready state (shown in FIG. 5) within the punch guidance 13. This way, by rotating the rings 6 and 10 against each other, the constricting components 3, 4 and 5 are brought into their closed constricting position shown in FIG. 6 while swiveling them about their swivel pins 7. The braid (not represented here) of the tubular packaging casing is located in the resulting, roughly triangular opening (FIG. 6) then remaining. As FIG. 6 makes clear, in this constricting process simultaneously the matrix provided in the constricting component 3 on one hand and the closure clip 20 available in the constricting component 5 on the other hand were guided towards the opening 21. The section 18 in the flange 5d of the constricting component 5 thus prevents an impairment of the swivel process by the magazine 19 with the closure clips 20 located thereon. Finally, by action of the piston 16, the closure clip is guided around the braid of the packaging casing located in the opening 21 into the grooves 12 of the matrix, and the closure clip 20 is closed in its conventional way by bending of the legs. The punch 14 then moves back into its starting position and the constricting components 3, 4 and 5 are also swiveled back into their open positions in accordance with FIG. 1.

What is claimed is:

1. An apparatus for closing tubular containers of flexible material, with a clip, the apparatus comprising:

a carrier having an opening for the passage of a container of flexible material;

a plurality of constricting components pivotally mounted on the carrier and pivotally movable toward each other and into engagement with such a container at the opening for constricting the container and providing a container constriction;

a clip guide mounted on one of the plurality of constricting components for guiding clips to the container constriction;

a matrix mounted on another of the plurality of constricting components for receiving and closing a clip at the container constriction;

a punch mounted on said one of the constricting components and which can be advanced along a path for engaging and moving a clip toward the constriction and into engagement with the matrix and thereby closing the clip on the constriction; and a power source mounted on and movable with said one of the constricting components and coupled to said punch for moving said punch into engagement with a clip and pressing the clip into engagement with the matrix.

2. An apparatus as set forth in claim 1 wherein there are three said constricting components.

3. An apparatus as set forth in claim 2 wherein the carrier is a ring having an axis and has said opening concentric with said axis.

4. An apparatus as set forth in claim 3 wherein pivoting of said one component and of another constricting component moves the matrix and the punch path into alignment.

5. An apparatus as set forth in claim 3 wherein the constricting components have opposite ends and are pivotable at one end around pivots on the ring and disposed 120° apart on a circle concentric with said axis.

6. An apparatus as set forth in claim 5 wherein the ring is rotatable around said axis and further comprising closing means mounted on the ring and engageable with the other ends of the constricting components for moving the constricting components into engagement with the container with rotation of the ring.

7. An apparatus as set forth in claim 5 wherein a first one of the constricting components comprises a plate and the matrix is mounted thereon, a second one of the constricting components comprises, in part, a plate and in part, two plane-parallel sheets and a third one of the constricting components comprises two plane-parallel sheets spaced perpendicular to the planes of the sheets of the third one of the constricting components by a distance at least equal to the thicknesses of the plates of the first one and the second one of the constricting components to provide interleaving of the constricting components as the components are moved toward each other.

8. An apparatus as set forth in claim 7 wherein the two plane-parallel sheets of the second one of the constricting components adjoins the plate of the second one of the constricting components which provides a partition where the sheets and the plate adjoin and wherein, prior to movement of the constricting components toward each other, the partition has a face which extends radially of said axis.

9. An apparatus as set forth in claim 7 wherein the punch is mounted on the second one of the constricting components.

10. An apparatus as set forth in claim 7 wherein said first one of the constricting components and said second one of the constricting components have surfaces which face said axis and each of which has two parts which intersect at an obtuse angle included between the parts and wherein the matrix is disposed at the intersection of the two parts of the surfaces of said first one of the constricting components and the path of the punch passes through the intersection of the two parts of the surfaces of said second one of the constricting components.

11. An apparatus as set forth in claim 1 wherein the carrier is rotatable around an axis concentric with said opening in the carrier.

* * * * *